United States Statutory Invention Registration [19]

[11] Reg. Number: H488

Rowan [43] Published: Jul. 5, 1988

[54] HYDRAULIC JACKS FOR CONTROLLED LOAD TRANSFER

[76] Inventor: David Rowan, 816 Arlington St., Houston, Tex. 77007

[21] Appl. No.: 891,805

[22] Filed: Aug. 1, 1986

[51] Int. Cl.[4] ..... E02D 25/00

[52] U.S. Cl. ..... 405/209; 405/203; 405/204

[58] Field of Search ..... 405/203, 204, 209, 195, 405/196, 202, 211, 224; 92/48, 90, 91, 92

[56] References Cited

U.S. PATENT DOCUMENTS

| | | | |
|---|---|---|---|
| 2,210,408 | 8/1940 | Henry | 405/196 |
| 2,465,560 | 3/1949 | Warnke | 92/48 |
| 2,577,613 | 12/1951 | Friberg | 92/48 |
| 2,907,172 | 10/1959 | Crake | 405/209 |
| 2,973,046 | 2/1961 | McLean et al. | 405/203 |
| 2,997,852 | 8/1961 | Suderow | 405/209 |
| 3,078,680 | 2/1963 | Wepsala | 405/209 |
| 3,121,997 | 2/1964 | Sampson | 405/211 |
| 3,138,932 | 6/1964 | Kofahl et al. | 405/209 |
| 3,375,619 | 4/1968 | Hurkamp | 92/90 |
| 3,461,828 | 8/1969 | Bielstein | 405/224 |
| 3,977,346 | 8/1976 | Natvig et al. | 405/203 |
| 4,069,680 | 1/1978 | Erler | 405/195 |
| 4,222,683 | 9/1980 | Schaloske et al. | 405/204 |
| 4,242,011 | 12/1980 | Karsan et al. | 405/204 |
| 4,252,468 | 2/1981 | Blight | 405/204 |
| 4,408,930 | 10/1983 | Ninet et al. | 405/209 |
| 4,413,926 | 11/1983 | Ninet | 405/204 |
| 4,436,454 | 3/1984 | Ninet et al. | 405/204 |
| 4,487,526 | 12/1984 | Struve et al. | 405/196 |

FOREIGN PATENT DOCUMENTS

| | | | |
|---|---|---|---|
| 351025 | 8/1920 | Fed. Rep. of Germany | 92/92 |
| 763351 | 2/1934 | France | 92/92 |

*Primary Examiner*—Deborah L. Kyle
*Assistant Examiner*—Michael J. Carone

[57] ABSTRACT

A load transfer device and method is disclosed for rapid, controlled transfer of a load between two support surfaces such as transfer of a prefabricated deck from a barge to an offshore deck support structure. The load transfer device connects a piston chamber to a support base on the barge and receives the prefabricated deck on one end of the piston rod, the other end of which is received within the piston chamber and is supported upon an enclosing membrane of a bladder assembly which distends and contracts as hydraulic fluid enters and is dispelled therefrom to raise, support or lower the piston rod.

22 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDRAULIC JACKS FOR CONTROLLED LOAD TRANSFER

BACKGROUND OF THE INVENTION

This invention relates to a method and apparatus for controlled, rapid load transference between first and second support surfaces. More particularly, the present invention relates to transferring a load such as a prefabricated deck from a barge to an offshore deck support structure utilizing improved hydraulic jacks.

It has been found cost effective to fabricate certain major subassemblies of offshore drilling platforms onshore and then join the subassemblies by floating mating operations offshore. The drilling platform deck is one such major subassembly appropriate for onshore fabrication, provided that it can be effectively transferred to deck support structures offshore. Numerous deck support structures might accept such a prefabricated deck including rigid towers, compliant pile towers, semisubmersible vessels, and tension leg platforms.

Prefabricated decks have been joined to deck support structures offshore in the prior art by transporting the deck to the platform site by barge, maneuvering the barge between a plurality of deck support members to position the deck over the deck support members and transferring the weight of the deck to the deck support members by ballasting the barge. Alternatively, hydraulic jacks have been used in the prior art to effect this transfer. However, neither approach has been effective in transferring the deck weight quickly enough to prevent wave motions operating on the barge from slamming both the barge and the deck support members into the deck during the latter stages of load transfer. Further, excessively rapid transfer accentuates the slamming action in that removing the load from the barge too quickly causes excited motions of the floating barge to combine with wave motions of the ambient sea conditions. This problem is even more severe where the deck support structure is itself a floating structure as in the case of semisubmersibles and tension leg platforms.

SUMMARY OF THE INVENTION

The present invention is a load transfer device and method for rapid, controlled transfer of a load between two support surfaces. Both the device and method are of particular application in joining a prefabricated deck to an offshore deck support structure. In this case the load is the prefabricated deck and the two support surfaces are a barge and the deck support structure.

A load transfer device constructed in accordance with the present invention and employed in offshore platform construction connects a piston chamber to a support base on the barge and receives the prefabricated deck on one end of the piston rod, the other end of which is received within the piston chamber and is supported upon an enclosing membrane of a bladder assembly which distends and contracts as hydraulic fluid enters and is dispelled therefrom to raise, support or lower the piston rod.

The method of transferring a prefabricated deck from a barge to an offshore deck support structure in accordance with the present invention includes supporting the deck on the barge upon an array of hydraulic jacks in which the load is carried by bladder assemblies filled with a hydraulic fluid, then positioning the deck over the deck support members and draining the hydraulic fluid from the enclosing membrane within the hydraulic jacks thereby lowering the deck onto the deck support structure and then removing the barge from beneath the deck.

BRIEF DESCRIPTION OF THE DRAWINGS

The brief description above, as well as further features and advantages of the present invention will be more fully appreciated by reference to the following detailed description of the preferred embodiment which should be read in conjunction with the accompanying drawings in which.

DESCRIPTION OF THE PREFERRED EMBODIMENTS

Figure 1:
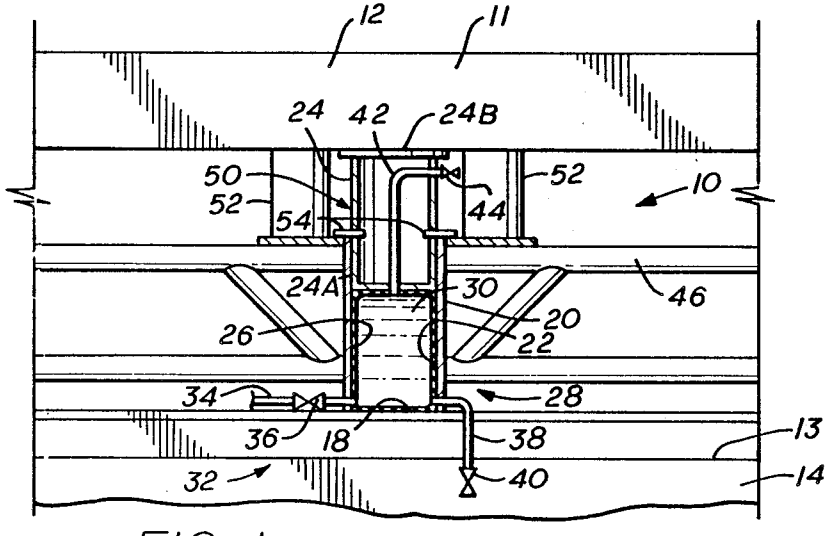
FIG. 1 is a cross-sectional view of a controlled load transfer device constructed in accordance with the present invention.
Figure 6:
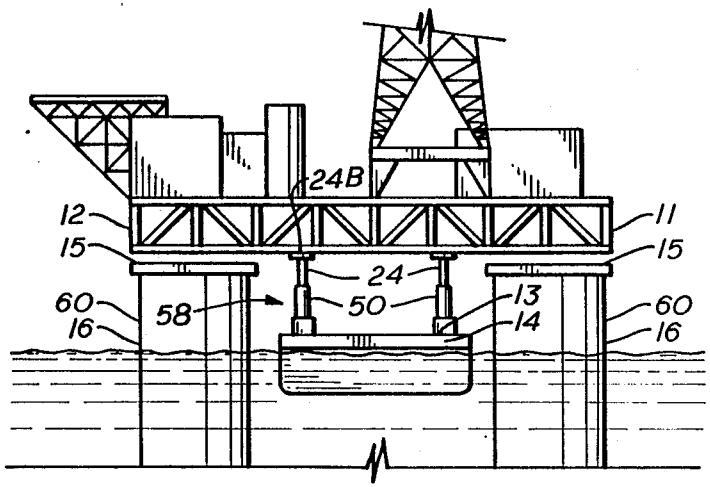
FIG. 6 is a front elevational view of a barge deploying controlled load transfer devices of the present invention positioning the deck over the deck support structure in accordance with the method of the present invention.

Referring to FIG. 1 of the drawings, reference numeral 10 refers generally to a controlled load transfer device constructed in accordance with the present invention. In the preferred embodiment, load transfer device 10 is configured to transfer a load 11, illustrated as prefabricated drilling deck 12, from a first support surface 13 to a second support surface 15, illustrated as barge 14 and offshore deck support structure 16, respectively. The offshore deck support structure is illustrated in FIG. 6. Those having ordinary skill in the art will recognize that the present invention can be employed with numerous types of offshore deck support structures including rigid towers, compliant pile towers, semisubmersible vessels, and tension leg platforms.

Returning to FIG. 1, load transfer device 10 is supported by barge 14 at support base 18. Cylinder 20 defines a piston chamber 22 and is connected to the support base. The first end 24A of piston rod 24 is slideably received within piston chamber 22 and presents its second end as load engaging surface 24B. Enclosing membrane or bladder 26 fills the piston chamber between piston rod 24 and support base 18. The enclosing membrane is filled with a hydraulic fluid 30 which controls the volume of the enclosing membrane within piston chamber 22 and thereby the position of load engaging surface 24B in relation to support base 18.

Enclosing membrane 26 is part of a bladder assembly 28 which also includes means 32 for conducting hydraulic fluid 30 into and out from the enclosing membrane. The conducting means of FIG. 1 is provided by fill line 34 which connects a reservoir and pump (not shown) to the interior of enclosing membrane 26 through valve 36 and connects the interior of the enclosing membrane to the exterior environment through outlet line 38 and valve 40. Further, the preferred embodiment provides vent line 42 communicating with the top of enclosing membrane 26 through valve 44.

FIG. 1 further illustrates cribbing 46 which provides additional support for the load and distributes the load across barge 14. The cylinder and piston rod assembly previously described is generally referred to in FIG. 1 as hydraulic jack 50. In transporting deck 12 across distances that require prolonged support on barge 14, hydraulic jack 50 can be supplemented with removable supports 52 which carry the load of deck 12 and transfer it directly to cribbing 46.

The sequence of FIGS. 1 through 4 illustrate the operation of load transfer device 10. As discussed above, FIG. 1 illustrates the transportation mode in which deck 12 is supported on barge 14 by removable supports 52 which carry the load of deck 12 upon cribbing 46. Further, it may be preferred that all fluid be drained from enclosing membrane 26 for extended transport. In this instance, and with load 11 carried by removable supports 52, retractable pins 54 can be deployed to fix pistion rod 24 in a somewhat distended position which facilitates filling enclosing membrane 26 with hydraulic fluid.

After barge 14 has carried deck 12 into close proximity to an offshore deck support structure, removable supports 52 are withdrawn. Deck 12 is lifted from rest upon supports 52 by pumping hydraulic fluid 30 through fill line 34 with valve 36 open and with valve 40 closed to prevent the hydraulic fluid from leaving through outlet line 38. See FIG. 2. If fluid has been drained from enclosing membrane 26 during transport, it will be necessary to first fill the enclosing membrane with valve 44 open to permit air within enclosing membrane 26 to exit through vent line 42. Once all air has been removed from the enclosing membrane, valve 44 is closed and hydraulic pressure causes the enclosing membrane to expand and thereby distend piston rod 24. After deck 12 has been disengaged from supports 52, the supports are removed and retractable pins 54 are no longer needed and are removed. See FIG. 3.

Figure 2:
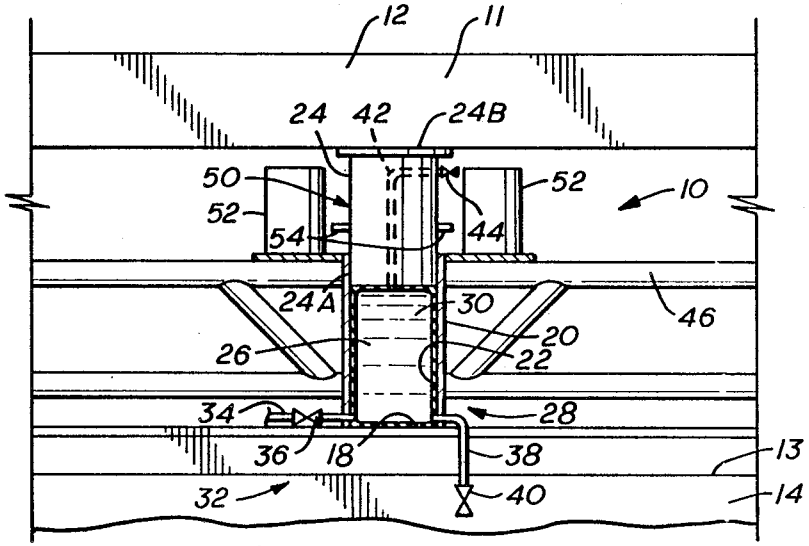
FIG. 2 is a cross-sectional view of a controlled load transfer device constructed in accordance with the present invention in which the piston arm has been distended to remove the load from the removable supports.
Figure 4:
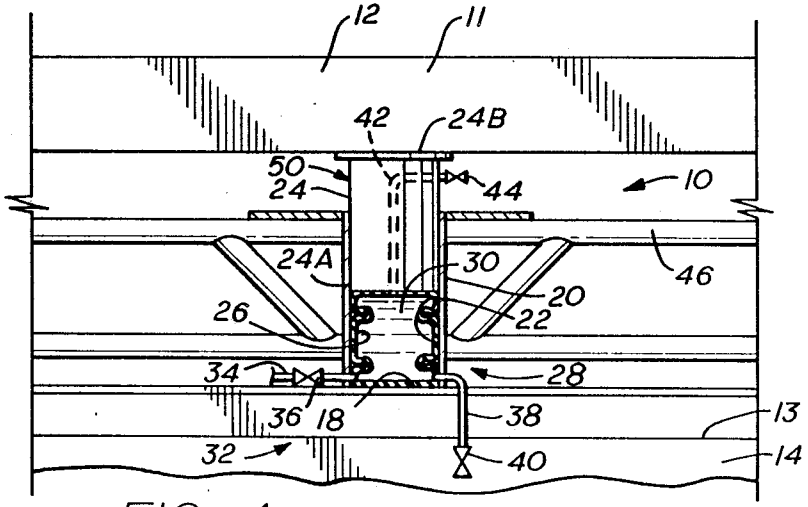
FIG. 4 is a cross-section view of a controlled load transfer device constructed in accordance with the present invention in which the hydraulic fluid is being removed from the bladder assembly.
Figure 3:
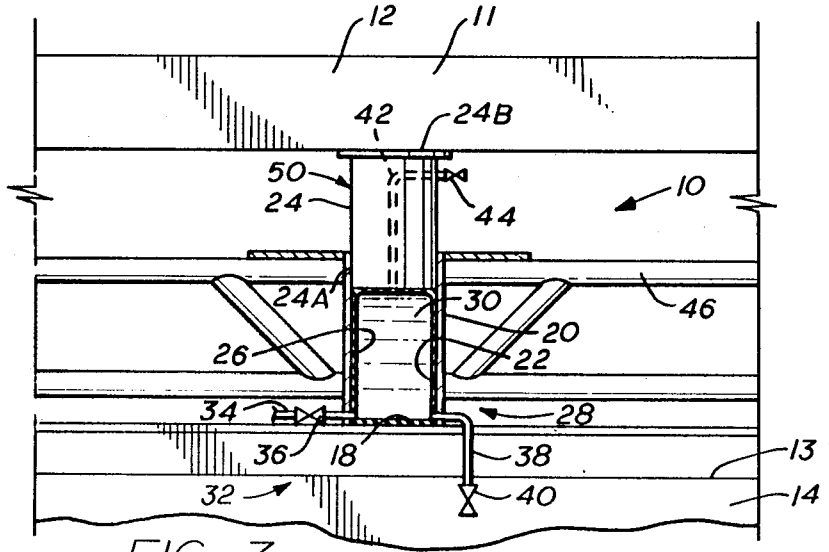
FIG. 3 is a cross-section a controlled load transfer device constructed in accordance with the present invention in which removable supports have been removed.

FIG. 3 illustrates load transfer device 10 in which hydraulic jack 50 is carrying the load of deck 12 while barge 14 is maneuvered to place deck 12 in position for lowering into engagement with an offshore deck support structure. Hydraulic fluid 30 is held within enclosing membrane 26 by closing valve 36 in fill line 34 and closing valve 40 in outlet line 38. FIG. 4 illustrates the lowering of deck 12 by discharge of hydraulic fluid 30 through outlet line 38 by opening valve 40. Valve 44 of vent line 42 remains closed through the lowering procedure so that all hydraulic fluid 30 is expelled through outlet 38.

Valve 40 controls the rate at which hydraulic fluid 30 is drained from enclosing bladder 26 and thereby controls the rate at which piston rod 24 sinks into piston chamber 22 of cylinder 20. Retracting piston rod 24 lowers deck 12 and rests it upon the offshore deck support structure and piston rod 24 continues to drop to where it is no longer subject to slapping against the bottom of deck 12 by wave action acting upon barge 14.

Figure 5:
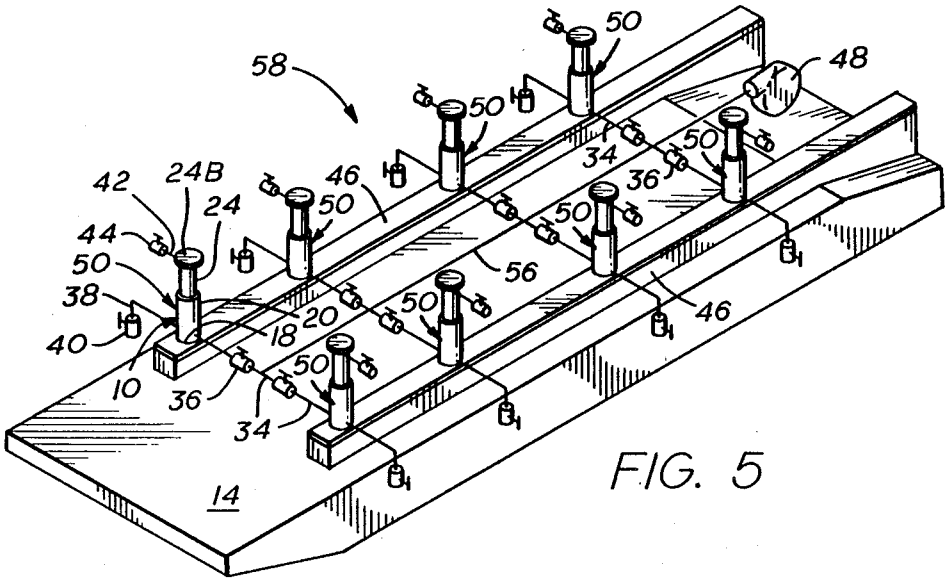
FIG. 5 is a perspective schematic illustration of a barge in which a plurality of load transfer devices constructed in accordance with the present invention have been deployed in an array.

In the preferred embodiment, a plurality of hydraulic jacks 50 are mounted on barge 14 in an array within cribbing 46 as illustrated in FIG. 5. FIG. 5 is a schematic drawing and illustrates pump 48 leading to fill lines 34 through supply line 56 through valves 36. In the preferred embodiment, the hydraulic fluid is sea water which can be drawn from the ocean by pump 48 and expelled directly into the ocean from outlets 38 through valves 40. In addition, vent lines 42 are illustrated which discharge though valves 44. Various means of valve control are known in the art in which the array 58 of hydraulic jacks 50 can be operated in a coordinated manner in the raising and lowering operations discussed above.

Figure 8:
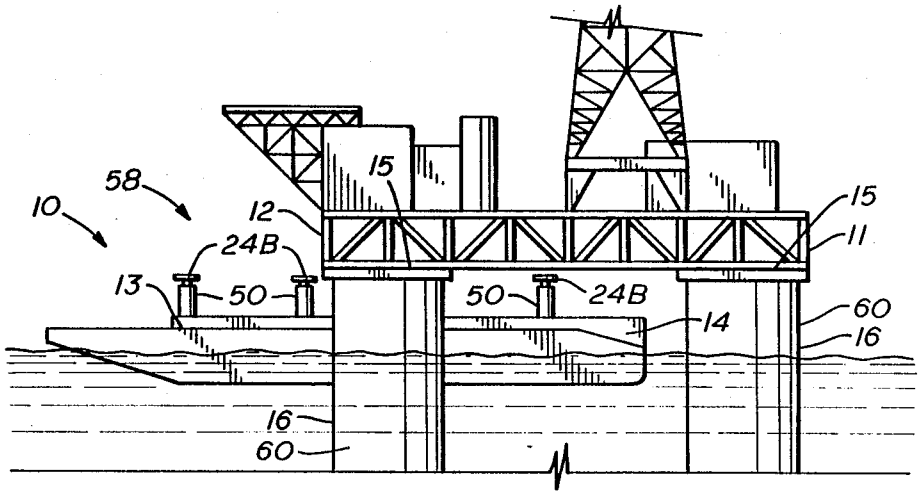
FIG. 8 is a side elevational view of a barge deploying load transfer devices of the present invention being removed from beneath the deck in accordance with the method of the present invention.
Figure 7:
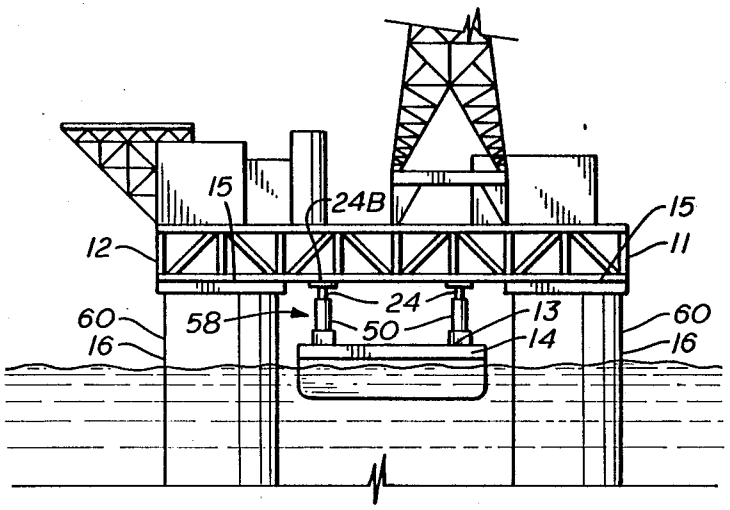
FIG. 7 is a front elevational view of a barge deploying load transfer devices of the present invention lowering a deck onto the deck support structure in accordance with the method of the present invention.

A method for transferring a prefabricated deck from barge 14 to deck support structure 16 is illustrated in FIGS. 6 through 8 which should be read in conjunction with the foregoing figures and discussion. FIG. 6 illustrates deck 12 being supported by array 58 of hydraulic jacks 50 on barge 14 while the deck is positioned over deck support members 60 of deck support structure 16. Once in position, deck 12 is lowered into position in a rapid, controlled deployment by draining the hydraulic fluid from the bladder assemblies within hydraulic jacks 50 in accordance with the foregoing discussion. See FIG. 7. After deck 12 is firmly seated upon deck support members 60 of deck support structure 16, further hydraulic fluid is drained from the bladder assemblies and the load engaging surfaces 24*b* of piston rods 24 are further lowered in a continued deployment so that wave action acting on barge 14 will no force load engaging surfaces 24B to slam into the underside of deck 12. Thereafter the barge is removed from beneath the deck. See FIG. 8.

In addition, the method for transferring the prefabricated deck from the barge onto an offshore deck support structure can further include use of removable supports 52 by adding the steps of supporting the barge on the removable supports during transportation to the offshore deck support structure and then rigging for deployment by transferring the deck load to an array of hydraulic jacks 50 by distending piston rods 24 until the hydraulic jacks carry the load of the deck and then removing the supports.

This invention facilitates offshore construction by providing for rapid, controlled load transfer of prefabricated subassemblies constructed onshore to other subassemblies positioned offshore.

Other modifications, changes and substitutions are intended in the foregoing disclosure and in some instances some features of the invention will be employed without a corresponding use of other features. Accordingly, it appropriate that the appended claims be construed broadly and in a manner consistent with the spirit and scope of the invention herein.

I claim:

1. A controlled load transfer device comprising:

a support base;

a cylinder defining a piston chamber connected to the support base;

a piston rod having its first end receivable within the piston chamber;

a load engaging surface on the second end of the piston rod; and a bladder assembly comprising:

an enclosing membrane within the piston chamber between the first end of the piston rod and the support base;

means for conducting a hydraulic fluid into the enclosing membrane;

means for conducting the hydraulic fluid out from the enclosing membrane; and means for controlling the rate of flow of the hydraulic fluid out from the enclosing membrane.

2. A controlled load transfer device constructed in accordance with claim 1 wherein:

the means for conducting the hydraulic fluid into the enclosing membrane comprises:

a fill line connected to a hydraulic fluid reservoir at one end and to the interior of the enclosing membrane at the other end;

an inlet control in the fill line; and means for driving the hydraulic fluid through the fill line and into the enclosing membrane;

and the means for conducting the hydraulic fluid out from the enclosing membrane comprises:

an outlet line connected to the interior of the bladder on one end and to a discharge line on the other end; and means for driving the hydraulic fluid out of the enclosing membrane.

3. A controlled load transfer device utilizing a hydraulic fluid for transferring a load from a first support surface to a second support surface comprising;

a support base connected to the first support surface;

a cylinder defining a piston chamber connected to the support base;

a substantially vertical piston rod having its first end receivable within the piston chamber;

a load supporting surface on the second end of the piston rod; the piston rod throwing between an extended position higher than the second support surface and a contracted position lower than the second support surface; and a bladder assembly comprising:

an enclosing membrane for containing the hydraulic fluid within the piston chamber between the first end of the piston rod and the support base;

a controlled fill line for introducing hydraulic fluid into the enclosing membrane;

an outlet line for releasing the hydraulic fluid out from the enclosing membrane; and an outlet valve for controlling the rate of release of the hydraulic fluid out from the enclosing membrane through the outlet line;

whereby the load is carried on the load supporting surface on the second end of the piston rod when the enclosing membrane is full of the hydraulic fluid and the load can be rapidly transferred at a controlled rate to the second support surface by releasing the hydraulic fluid at a controlled rate through the outlet valve and deflating the enclosing membrane.

4. A controlled load transfer device in accordance with claim 3 wherein the load is a prefabricated deck, the first support surface is a barge and the second support surface is an offshore deck support structure.

5. A controlled load transfer device in accordance with claim 3 further comprising removable supports placeable between the load and the first support surface for releasing the loading of the enclosing membrane through the load support surface and the piston rod.

6. A controlled load transfer device for transferring a prefabricated deck from a barge to an offshore support structure, comprising;

an array of hydraulic cylinders attached to the barge, each hydraulic cylinder comprising:

a support base attached to the barge;

a cylinder defining a piston chamber vertically oriented over the support base;

a piston rod having its first end receivable within the piston chamber;

a load engaging surface on the second end of the piston rod configured to engage the underside of the prefabricated deck;

a bladder assembly comprising:

an enclosing membrane within the piston chamber between the first end of the piston rod and the support base;

means for conducting a hydraulic fluid into the enclosing membrane;

means for conducting the hydraulic fluid out from the enclosing membrane; and means for controlling the rate of flow of the hydraulic fluid out from the enclosing membrane; and a control system for coordinating throughout the array the respective means for conducting the hydraulic fluid in each hydraulic cylinder.

7. A controlled load transfer device constructed in accordance with claim 6 wherein seawater is the hydraulic fluid.

8. A controlled load transfer device constructed in accordance with claim 7 wherein the control system comprises a pump connecting seawater from the ocean to the means for conducting the hydraulic fluid into the enclosing membrane and wherein seawater conducted out of the enclosing membrane returns to the ocean.

9. A controlled load transfer device in accordance with claim 6 further comprising removable supports placeable between the prefabricated deck and the barge.

10. A controlled load transfer device in accordance with claim 9 further comprising retractable pins engagable between the cylinders and the respective piston rods.

11. A controlled load transfer device in accordance with claim 10 further comprising a sealable vent line connected to the top of each enclosing membrane.

12. A method for transferring a prefabricated deck from a barge to an offshore deck support structure comprising;

supporting the deck on the barge upon an array of hydraulic jacks in which the load is carried by bladder assemblies filled with a hydraulic fluid;

positioning the deck over the deck support members;

lowering the deck onto the deck support member in a rapid, controlled deployment by draining the hydraulic fluid from the bladder assemblies within the hydraulic jack at a rate controlled by an outlet valve from the bladder assemblies; and removing the barge from beneath the deck.

13. A method for transferring a prefabricated deck from a barge to an offshore deck support structure in accordance with claim 12, further comprising the additional steps:

supporting the deck on the barge on removable supports set between the barge and the deck; and rigging for deployment by transferring the deck load to the array of hydraulic jack in which the piston rods which are supported by bladders filled with hydraulic fluids, said rigging for deployment including the following steps:

pumping hydraulic fluid into the bladders causing them to inflate and distend the piston rods supported thereby to lift the deck off the removable supports; and removing the removable supports.

14. A controlled load transfer device in accordance with claim 2 wherein the means for controlling the rate of flow of the hydraulic fluid out from the enclosing membrane comprises an outlet control in the outlet line.

15. A controlled load transfer device in accordance with claim 14 wherein the outlet control is a valve.

16. A controlled load transfer device comprising:

a support base;

a cylinder defining a piston chamber connected to the support base;

a piston rod having its first end receivable within the piston chamber;

a load engaging surface on the second end of the piston rod; and a bladder assembly comprising:

an enclosing membrane within the piston chamber between the first end of the piston rod and the support base; and means for conducting seawater into and out from the enclosing membrane.

17. A controlled load transfer device constructed in accordance with claim 16 wherein the means for conducting the seawater into and out from the enclosing membrane comprises:

a fill line connected to a body of seawater at one end and to the interior of the enclosing membrane at the other end;

means for driving the seawater through the fill line and into the enclosing membrane;

an outlet line connected to the interior of the bladder on one end and to a discharge line on the other end; and means for driving the seawater out of the enclosing membrane.

18. A controlled load transfer device in accordance with claim 17 wherein the discharge line discharges the seawater directly into the body of seawater.

19. A controlled load transfer device utilizing seawater for transferring a load from a first support surface to a second support surface comprising;

a support base connected to the first support surface;

a cylinder defining a piston chamber connected to the support base;

a substantially vertical piston rod having its first end receivable within the piston chamber;

a load supporting surface on the second end of the piston rod; the piston rod throwing between an extended position higher than the second support surface and a contracted position lower than the second support surface; and a bladder assembly comprising:

an enclosing membrane for containing the seawater within the piston chamber between the first end of the piston rod and the support base;

a controlled fill line for introducing seawater into the enclosing membrane;

an outlet line for releasing the seawater out from the enclosing membrane; and an outlet valve for controlling the rate of release of the seawater out from the enclosing membrane through the outlet line;

whereby the load is carried on the load supporting surface on the second end of the piston rod when the enclosing membrane is full of the seawater and the load can be rapidly transferred at a controlled rate to the second support surface by releasing the seawater at a controlled rate through the outlet valve and deflating the enclosing membrane.

20. A controlled load transfer device in accordance with claim 18 wherein the load is a prefabricated deck, the first support surface is a barge and the second support surface is an offshore deck support structure.

21. A controlled load transfer device for transferring a prefabricated deck from a barge to an offshore support structure, comprising;

an array of hydraulic cylinders attached to the barge, each hydraulic cylinder comprising:

a support base attached to the barge;

a cylinder defining a piston chamber vertically oriented over the support base;

a piston rod having its first end receivable within the piston chamber;

a load engaging surface on the second end of the piston rod configured to engage the underside of the prefabricated deck;

a bladder assembly comprising:

an enclosing membrane within the piston chamber between the first end of the piston rod and the support base;

a fill line for introducing seawater into the enclosing membrane;

an outlet line for releasing the seawater out from the enclosing membrane; and an outlet valve for controlling the rate of release of the seawater from the enclosing membrane through the outlet line; and a control system for coordinating throughout the array the respective means for conducting the seawater in each hydraulic cylinder.

22. A method for transferring a prefabricated deck from a barge to an offshore deck support structure, comprising the steps of:

supporting the deck on the barge upon an array of hydraulic jacks so that the deck is carried by bladder assemblies within the hydraulic jacks that are filled with seawater;

positioning the deck over a set of deck support members;

lowering the deck onto the deck support members in a rapid, controlled deployment by draining the seawater from the bladder assemblies within the hydraulic jacks; and removing the barge from beneath the deck.

* * * * *